United States Patent [19]
Fries

[11] 4,098,855
[45] Jul. 4, 1978

[54] METHOD OF MOLDING FOAMED POLYURETHANE ARTICLES

[76] Inventor: Bernd Fries, Ernst-Heinkel-Weg 21, Nuremberg, Fed. Rep. of Germany

[21] Appl. No.: 668,718

[22] Filed: Mar. 19, 1976

Related U.S. Application Data

[63] Continuation-in-part of Ser. No. 477,364, Jun. 7, 1974, abandoned.

[30] Foreign Application Priority Data

Jun. 19, 1973 [DE] Fed. Rep. of Germany ....... 2331241

[51] Int. Cl.² ............................................. B29D 27/04
[52] U.S. Cl. ................................. 264/50; 23/252 R; 264/53; 366/96
[58] Field of Search .................. 264/50, 54, DIG. 26, 264/53; 259/4 R, 18; 23/252 R; 260/2.5 BD

[56] References Cited

U.S. PATENT DOCUMENTS

| | | | |
|---|---|---|---|
| 2,885,268 | 5/1959 | Breer et al. | 264/54 X |
| 3,063,952 | 11/1962 | Vieli | 261/DIG. 26 |
| 3,251,092 | 5/1966 | Printz | 264/50 X |
| 3,771,963 | 11/1973 | Breer et al. | 259/4 R X |
| 3,772,224 | 11/1973 | Marlin et al. | 264/50 X |
| 3,773,298 | 11/1973 | Gebert | 261/DIG. 26 |
| 3,788,337 | 1/1974 | Breer | 261/DIG. 26 |
| 3,917,779 | 11/1975 | Breer et al. | 264/54 X |
| 3,936,036 | 2/1976 | Fries | 259/4 R |

FOREIGN PATENT DOCUMENTS 859,688 1/1961 United Kingdom ................ 259/4 R

OTHER PUBLICATIONS

Knox, R. E., "Frothing—A New Method for Producing Urethane Foams," in *Chemical Engineering Progress*, (vol. 57, No. 10), Oct. 1961, pp. 40-47.

*Primary Examiner*—Philip Anderson

[57] ABSTRACT

A method is described for molding foamed polyurethane, articles from a plurality of components, including a polyol, an isocyanate component and a volatile liquid blowing agent. The components are brought to a substantially constant temperature, charged with gas, mixed together by introducing them under elevated pressure in the form of jets into a confined chamber and then introduced into a preheated mould which is at a substantially constant temperature.

11 Claims, 3 Drawing Figures

METHOD OF MOLDING FOAMED POLYURETHANE ARTICLES

This application is a continuation-in-part of Ser. No. 477,364 filed June 7, 1974, now abandoned.

This invention relates to a method of molding foamed polyurethane articles.

In known methods involving the foaming of polyurethane in high-pressure apparatus, the individual synthetic material components are fed from a storage container via metering pumps to a mixing head and thence into the mould. The storage containers usually contain a compressed air cushion for the purpose of feeding the individual components to the metering pumps. For reasons of cost and safety a pressure of 3 Kg/cm$^2$ gauge/pressure is as a rule not exceeded in the storage containers. Since with very viscous synthetic material components this pressure very frequently does not insure the desired charging of the metering pumps, the choice of the components is somewhat limited. In the art of polyurethane foaming where polyol and isocyanate are present as starting components, the necessary blowing agent, which is of very low viscosity, is therefore added in the storage container so that a suitable mixture is formed therein, or the blowing agent is separately introduced at the intake side of the metering pump. The same applies to any optionally added accelerators.

When accelerators and/or blowing agents are directly added in the storage container it is imperative to work with fixed ratios of components and additives and these ratios can only be altered by step-by-step, time-consuming re-adaptation; more freedom exists in this respect in the intake-side addition of blowing agents and/or accelerators. But there too, a variation of the composition ratios from one charge into the mould to the next is not possible because of the necessarily present passage volume to the locus of feed to the mixing head.

It follows from the above described circumstances in the known methods that in these methods a comparatively great expenditure on apparatus must be accepted in order to keep the mixing and reaction times (molding times) brief. It is true that there is the possibility of speeding up the reaction of the components in the mould by greater acceleration of the reaction between the components. But there are limits to the degree of such acceleration, since excessively large additions of accelerators result in embrittlement of the castings produced.

It is thus a principal problem solved by this invention to shorten, in a method as described, the overall duration of a moulding cycle, more particularly the reaction time (shaping time), without the use of additional apparatus or of excessively large additions of accelerators.

According to one aspect of the present invention there is provided a method of molding foamed polyurethane articles from a plurality of liquid components including a polyol, an isocyanate and a volatile liquid blowing agent, comprising: (a) bringing the components to a substantially constant temperature of between about 30° and 45° C; (b) charging at least one of the components with a gas in a proportion of about 10 to 80 volume percent of gas; (c) mixing the components by introducing them under elevated pressure in the form of jets into a confined chamber; and (d) introducing the resultant mixture into a mold for shaping the articles, which has been brought to a substantially constant temperature of between about 55° and 70° C.

The combination of the above described steps generally enables the molding times to be reduced to less than half the times normally achieved with conventional methods in the molding of polyurethane articles. In this context the invention makes use of several influences and procedures known per se but in a unique and novel manner. Thus, raising the temperature of the starting components results in both a substantial speeding up of the inter-reaction between the components and a lowering of their viscosity. The lowering of viscosity in turn favorably affects the mixing characteristics of the components, since it is known that under identical conditions liquids mix more readily and thoroughly at lower viscosity. The mixing is further improved when jetting of the components occurs at an elevated pressure, such jetting again being practicable only with components of relatively low viscosity when somewhat limited pressures and suitable equipment is used. Jetting in this context means directing the liquid components under elevated pressure through nozzle bores into a common confined mixing chamber to preferably obtain continuous jets which impinge upon one another or on liquid collected on the bottom of the mixing chamber to create a heavy turbulence therein. It is also possible to spray the components into the mixing chamber, the jets being formed by a fog of small droplets. Jetting of this kind is preferably carried out in accordance with the teaching of Applicant's U.S. Pat. No. 3,936,036 issued Feb. 3, 1976. Finally, the speed of reaction may be further raised by the aforesaid appreciably improved mixing, since the rate of reaction also depends on the thorough mixing of the reagents.

Heating of the mold is necessary so that the reactivity of the mixed components is not reduced as they are introduced into the mold.

In accordance with the present invention, the components are for example circulated and meanwhile appropriately heated or cooled. Heating and charging the components with gas may be accomplished either simultaneously or separately. In the case of simultaneous heating and charging it is advantageous to keep the components during circulation under gas pressure, preferably less than 1 Kg/cm$^2$ gauge pressure, so that the components are saturated with gas according to the pressure selected. When these process steps are performed separately the gas may either be jetted through a nozzle opening into the components under pressure or the components are conducted through a chamber which is under gas pressure, while the components are already preheated to the desired temperature. While in the second case the components are only charged to saturation point, in the first case it is possible to introduce into the components quantities of gas which far exceed saturation, i.e. up to 80% by volume, preferably up to 45%. The gas may be air, nitrogen, ammonia or any other inert gas, which is relatively soluble in the components. The purpose of charging the components with gas is to preload the components with a cell-forming agent, whereby the gas present in the components later on, i.e. when the reaction of the components takes place, assists the blowing agent in forming finely divided bubbles, i.e. to produce the desired foam. The charging with gas exceeding the saturation point up to 80 volume percent, preferably up to 45 volume percent, is advantageous, because the considerable amount of gas present in the mixture allows for a substantial saving of blowing agent. The proportions of gas may generally vary 10 to 80 volume percent and preferably from 15 to 45 volume percent. Additionally, by utilizing this high percentage of gas a further reduction of the molding time may be obtained, as the lower amount of blowing agent in the mixture tends to develop lower or no significant pressures at all in the mold. Thus the mold may be opened earlier in order to eject the shaped article.

As a significant further consequence of the present invention it is now possible to feed in further additives, such as blowing media and accelerators, as known in the art, immediately prior to mixing of the components. There is thus considerably more latitude for varying the make-up ratios; and such variations can even be accomplished from one change to the next, since only insignificant lengths of passages lie between the inlet and the mixing head, the volume of which passages still contains a mixture of the earlier make-up ratio. Thus prior recirculation systems and the corresponding expenditure of additional apparatus can be avoided.

As a blowing agent a fluoron-chlorine-derivate of a hydro-carbon having the chemical formula $CFCl_3$, known as "Freon" is preferably employed. Other known blowing agents ("Freons") with similar chemical composition may also be employed. Accelerators for the purpose of foaming polyurethane are widely known and among them triethylamine or diethyl-(2)-methoxypropylamine, commercially available from BAYER AG, Leverkusen, under the trade name "DESMORAPID" are preferred.

Jetting of the components at elevated pressure, advantageously from 100 to 200 $Kg/cm^2$ gauge pressure, can be done by the metering pumps themselves. But it is particularly advantageous to connect between each respective storage vessel and metering pump a charging pump or feed pump by which the respective component is fed to the metering pump at an initial compression of preferably between 3 and 10 $Kg/cm^2$ gauge pressure. This charging or feed pump desirably works at a throughput which exceeds that of the metering pump by about 10%. The excess proportion of the component is returned to the storage container via a bypass.

Illustrative embodiments of the present invention will now be described with reference to the accompanying drawings, in which.

Figure 1:
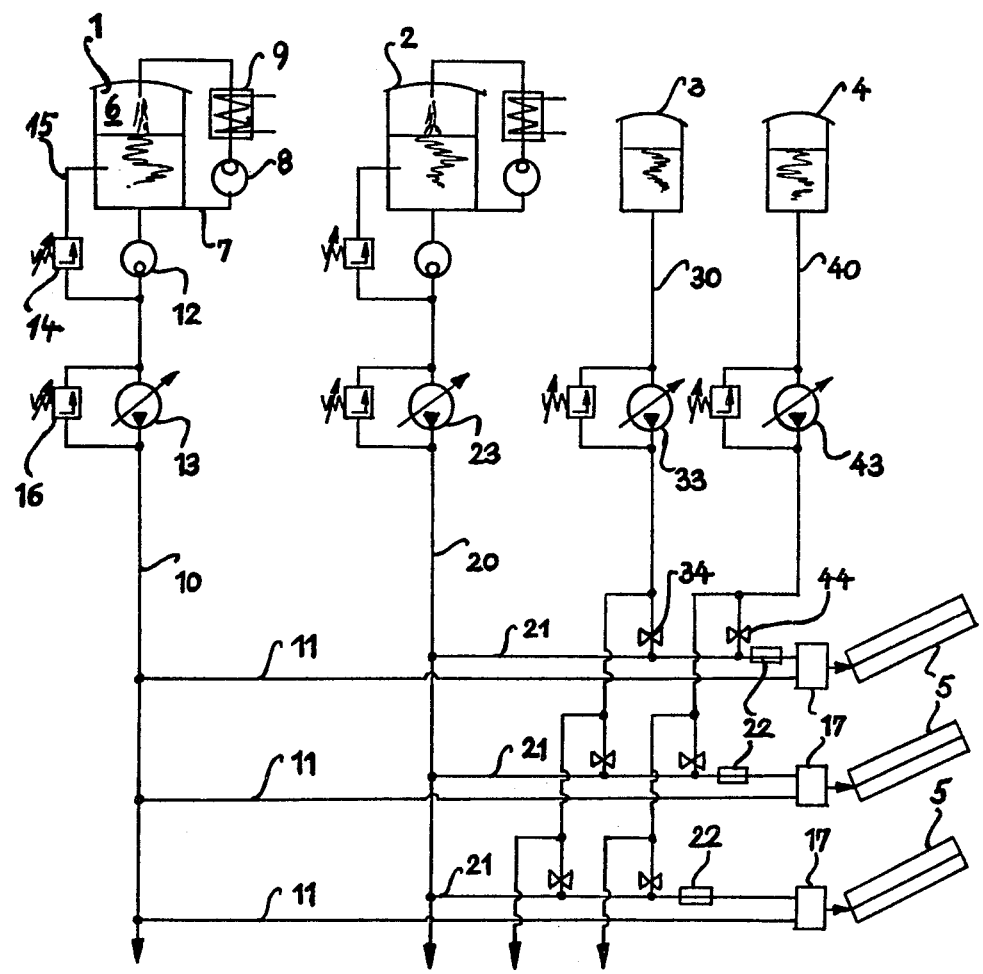
FIG. 1 shows a schematic circuit diagram of an apparatus useful in accordance with the method of the present invention.

The apparatus shown in the drawings will be described in conjunction with the production of shaped articles of polyurethane foam for which polyol and isocyanate are used as start-materials. While different polyols and isocyanates may be employed, it is preferable to employ a polyether polyol commercially available from BAYER, Leverkusen, under the trade name "Desmophen PU 1800" and a MDJ-diphenylmethane-diisocyanate commercially available from the same producer under the trade name "Desmodur 44 V 10 B". Foaming is accomplished in a foaming apparatus operating on the principle of mixing at elevated pressure. The foaming apparatus comprises a respective storage container 1, 2 for each of the two components, e.g. polyol and isocyanate, and storage containers 3, 4 for the blowing agent, e.g. "Freon", and the accelerator respectively. The storage containers 1 to 4 communicate with molds 5 via conduits comprising interposed conveying devices which will later be described. Since each of the respective storage containers 1, 2 for the components and 3, 4 for the additives, including the associated conduits and interposed conveying devices, are identical, it will be sufficient to describe in each case only one of the two storage containers 1, 2 and 3, 4 and its connections with molds 5.

The storage container 1 is leakproof and contains the component (e.g. polyol) in such quantity that a free gas volume 6 remains above the level of liquid, the gas being supplied by a source, conduit and opening not shown. From the bottom of the container 1 a circulation line 7 leads via a rotary pump 8 and through a heating arrangement 9 (e.g. a heat exchanger) back into the free gas volume 6 of the storage container 1. The rotary pump 8 circulates the polyol so that it impinges as a jet from above onto the surface of the liquid and thereby entrains gas from the free gas volume 6 into the liquid contained in the storage container 1, the gas being dissolved in the liquid up to the saturation point thereof. In the heating device 9 the polyol is substantially maintained at a temperature of between about 30° and 45° C by regulated heating or cooling. The free gas volume 6 is under pressure, preferably under a pressure of less than 1 $Kg/cm^2$ gauge pressure. The quantity circulated amounts to about 1/5 of the contents of the container 1 per minute. The circulating pump 8 can be periodically switched on and off and thus the degree of gas charging can be influenced. In the illustrated method this degree amounts to approximately 10 to 20 volume percent of the liquid.

From the bottom of the storage container 1 there extends a main feed line 10 from which feed lines 11 branch off to the moulds 5 which number three in the illustrated embodiment. Downstream of the storage container 1 there is interposed in the main feed line 10 a feed pump 12 by means of which the polyol which has been brought to the necessary temperature and charged with gas is suctioned out of the storage container 1 and directly fed, under pressure, to the intake side of a metering pump 13. The delivery pressure of the feed pump 12 amounts to 3 to 10 $Kg/cm^2$ gauge pressure, depending on the viscosity of the polyol, and can be adjusted by means of a pressure adjustment valve 14 arranged in a bypass conduit 15 which leads back from the delivery side of the feed pump 12 to the storage container 1. The throughput of the feed pump 12 is at least as large as the capacity of the metering pump 13 but advantageously it exceeds the latter by 10%, the excess amount delivered arriving back at the storage container 1 via the bypass conduit 15.

The metering pump 13 which is also provided with a pressure regulating valve 16 feeds metered quantities of the polyol component via the main conveying conduit 10 and the branch lines 11 at a pressure of between about 100 and 200 $Kg/cm^2$ gauge pressure to mixing heads 17 of which a respective one is associated with each mold 5. A mixing head which may be preferably employed is disclosed in abovementioned U.S. Pat. No. 3,936,036.

The storage container 2 containing the second component (e.g. isocyanate) has a main conveying line 20 from which parallel connected feed lines 21 branch off to the mixing heads 17. Into these feed lines 21 open successively respective conveying lines 30 and 40 originating in the respective storage vessels, 3, 4 of the additional components. In the delivery lines 30 and 40 there are connected metering pumps 33 and 43 respectively which feed, via respective control elements 34 and 44, into the branch lines 21 at closely succeeding points. The points of in-feed in turn are located directly upstream of a mixer 22 in which the main component flowing in the feed line 21 is mixed with the additional components upstream of the mixing head 17. The mixer 22 may be of any type suitable for intimate mixing of several liquid components delivered under pressure, and preferably a stirrerless mixer is used, e.g. as described in the abovementioned U.S. Pat. No. 3,936,036. Mixing heads 17 may be conventional devices as known in the art for combining various components from different sources immediately prior to introduction to the molds 5. The control elements 34 and 44 are normally closed but during the injection process they are open. Only those control elements 34, 44 which are associated with the respective mixing head 17 being in the course of action are opened. The quantity delivered by the metering pumps 33, 43 of the additives can be automatically or manually varied from injection into the mold so that the make-up of the components can be altered from one shaped article to the other. The make-up then has always the desired optimum value, since no recirculation is employed and thus build-up of the proportions of the additives is precluded.

When the main conveying conduits 10, 20 and the feed lines 11, 21 branching off from them are of great length, it is desirable to control the temperature of the conduits so as to maintain the main components at a value of between about 30° and 45° C.

One of the two components derived from the storage container 2 is mixed in the mixer 22 with the additional components delivered from the storage containers 3, 4. This mixture is then jetted into the mixing head 17 under the elevated pressure of the metering pump 23. The component originating in the storage container 1 is also jetted under elevated pressure in the mixing head 17, whereby intimate mixing of all components results. This mixture is then fed into the moulds 5 which are maintained at a constant wall temperature of between about 55° and 70° C by means of a heating arrangement (not shown).

In the illustrated embodiment the additives are mixed into the isocyanate. But if the polyol is more viscous, which is generally the case (800 to 3000 CP), then it is more advantageous to mix the highly fluid additional components into the polyol so as to lower its viscosity. But by virtue of the present method the viscosity of the polyol is considerably lower than in the hitherto known methods, since raising the temperature by 15° C results in the viscosity of the polyol being lowered to ¼ to 1/5 of the original value. The gas charging step also appreciably contributes to lowering the viscosity.

Figure 2:
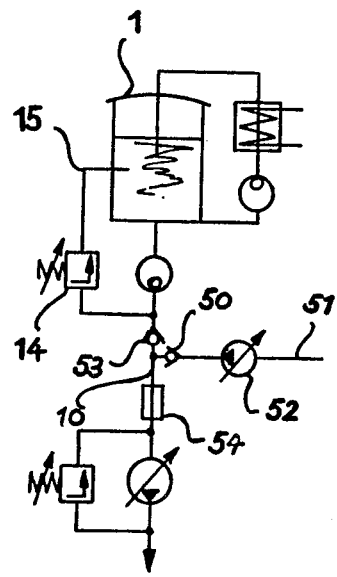
FIG. 2 shows a modified detail of the circuit diagram of FIG. 1, wherein the gas is charged in a different manner.
Figure 3:
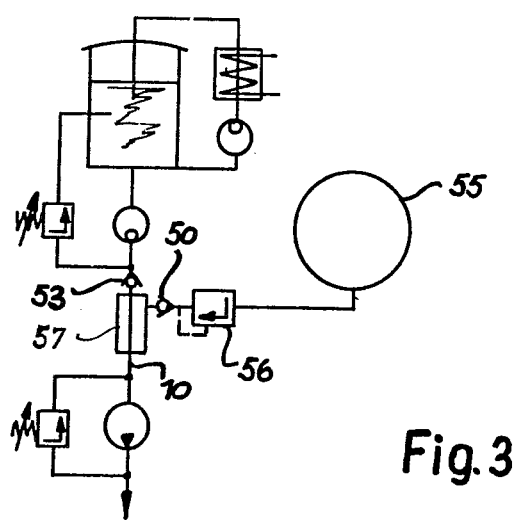
FIG. 3 shows a further variant of the same detail.

Instead of performing the gas charging step in the storage container it is possible to feed the gas directly into the main conveying conduit 10 (or 20), between the point where the bypass line 15 branches off and the metering pump 13. The time of charging gas to the entire contents of the container is then eliminated since gas is directly charged only to that quantity of the component which is required for the molding during the injection process. FIGS. 2 and 3 show apparatus embodiments useful with this kind of gas charging.

In FIG. 2 a gas feed line 51 containing a metering element 52, e.g. a pump, opens via a non-return valve 50 into the main conveying conduit 10. In the conduit 10, upstream of the point where the line 51 opens thereinto, there is disposed a further non-return valve 53 which prevents return flow toward the storage container 1. The metering element 52 delivers gas with a pressure exceeding the pressure of the component considerably. Thus the gas is sparged or jetted via a small opening (not shown) into the streaming component, whereby the metering element is adjusted to deliver the desired quantity of gas. That quantity of gas which exceeds the capacity of the component to dissolve the gas remains undissolved in the state of a multiplicity of minute bubbles. Downstream of the point of debouching there is a mixer 54 which assists in distributing the gas jetted in from line 51 in the component and which may be of any known type for this purpose.

With this type of gas delivery it is possible to introduce gas beyond the saturation state into the component, if this is desired. If it is intended to charge the components with gas substantially above the saturation point, it is preferred to use a gas charging apparatus according to copending U.S. patent application Ser. No. 531,033 filed on Dec. 9, 1974 which provides for injecting the gas via an adjustable throttle, whereby the pressure of the gas upstream of the throttle is at least twice the pressure of the liquid component to be charged. In this way the amount of gas to be injected may be precisely adjusted with the throttle independently of pressure differences in the component. Should this not be necessary, then the embodiment of FIG. 3 has advantages with respect to the apparatus since it is of greater simplicity. In this embodiment the gas is stored in a pressure-gas reservoir (air reservoir) 55 from which the gas reaches a gas charging station 57, through which the component flows, via a pressure relief valve 56 and via a non-return valve 50. The pressure relief valve 56 reduces the gas pressure to a pressure corresponding to the pressure of the component or slightly higher than this pressure. The gas charging station 57 is a container through which the component is streaming and into which the gas is introduced via an opening therein (not shown). The component thereby absorbs gas up to saturation state from the gas charging station 57. The accuracy of the amount of gas charged depends in this case of course, on the components capacity of absorbing the gas in question, which capacity is generally temperature- and pressure-dependent, while in the embodiment of FIG. 2 there is no such dependence on absorption capacity.

With the embodiments of FIGS. 2 and 3 gas is charged during the metering or injection time. The gas may be fed in the form of an activated gas current.

What is claimed is:

1. A method of molding foamed polyurethane articles from a plurality of liquid components including main components comprising a polyol and an isocyanate, and additional components comprising at least a volatile liquid blowing agent, said method comprising:
   (a) bringing said main components to a substantially constant temperature of between about 30° and 45° C;
   (b) charging at least one of said main components with a gas in a proportion of about 10 to 80 volume percent of gas;
   (c) mixing said main and additional components by introducing them under elevated pressure in the form of jets into a confined chamber; and
   (d) introducing the resultant mixture into a mold for shaping the articles, which has been brought to a substantially constant temperature of between about 55° and 70° C.

2. A method according to claim 1, wherein at least one of said main components is charged with a gas in a proportion of about 15 to 45 volume percent of gas.

3. A method according to claim 1, wherein said main components are separately charged with gas.

4. A method according to claim 1, wherein prior to said mixing of said components said blowing agent is premixed with at least one of said main components, whereupon the resultant premixture is mixed with the rest of said components to obtain said mixture.

5. A method according to claim 4 wherein the components further include an accelerator which is premixed together with said blowing agent and said one of said main components.

6. A method according to claim 3, wherein said main components are each circulated and the temperature thereof is adjusted to that required for molding.

7. A method according to claim 3, wherein the temperature of said main components is adjusted to that required for molding and said charging with gas of said main components is performed simultaneously with such temperature adjustment.

8. A method according to claim 7, wherein said adjustment of temperature and charging with gas are performed at a gas pressure of less than 1 kg/cm$^2$ gauge.

9. A method according to claim 3, wherein said adjustment of temperature and charging with gas are performed separately and said gas is sparged into the components under a pressure substantially exceeding the pressure of the components.

10. A method according to claim 3, wherein said adjustment of temperature and charging with gas are performed separately and said main components to be charged with gas are each passed through a chamber, into which gas having substantially the pressure of said components is injected.

11. A method according to claim 1, wherein only the polyol and the isocyanate are charged with gas.

* * * * *